3,687,680
ANIMAL FEED CONTAINING MORTMORILLONITE CLAY

John Krchnavi and William D. Leech, Riverside, Calif., assignors to Bio-Med Research Corporation, Loma Linda, Calif.
No Drawing. Filed Aug. 4, 1970, Ser. No. 60,919
Int. Cl. A23k 1/00
U.S. Cl. 99—4      13 Claims

ABSTRACT OF THE DISCLOSURE

A montmorillonite clay is added to a nutritionally adequate animal diet. The montmorillonite clay utilized is a low expansion clay which is low in sodium, high in calcium, low in silica and low in aluminum oxide.

---

This invention relates to animal feed compositions and methods and particularly to poultry feed compositions and methods.

Considerable attention has been given to investigating the components of animal feed and in particular to poultry feed so as to maximize the growth and vigor of the animal. The extensive investigations which have been conducted on the nutritional requirements of animals and in particular poultry have established with considerable precision the most desirable levels of various nutrients to produce the desired effect on the animal. The vitamin and mineral requirements and other dietary factors for various animals have been investigated at length so that it is possbile to formulate animal feed diets which are nutritionally balanced to achieve the desired result. Also various growth promoters have been discovered and their effects investigated so that they may be included in an animal's diet with predictable results.

According to this invention it has been discovered that the inclusion in a nutritionally adequate diet of an effective amount of a naturally occurring clay mineral will improve almost every aspect of the animal's growth and productivity. The clay which is utilized is a low expansion montmorillonite which is low in sodium, high in calcium, low in silica and low in aluminum.

The montmorillonite mineral is preferably combined with a substantially complete animal ration in an amount ranging from about 1 to 20 weight percent of the ration, and preferably from about 2 to 7 weight percent of the total ration, exclusive of water. In that instance where the montmorillonite is combined with a nutritionally adequate poultry feed, the poultry feed normally contains from about 2.5 to 7 weight percent fat, 14 to 30 weight percent protein, 40 to 60 weight percent carbohydrates, up to 8 percent fiber content, 8 to 16 percent ash, the minimum established levels of the essential vitamins and minerals and the balance moisture.

The montmorillonite is a dry material which may be incorporated in the animal feed by any suitable procedure such as, for example, mixing or blending.

The use of from about 2 to 7 weight percent of the montmorillonite described above in a complete ration for chickens has several marked effects. With regard to the chicken itself, the use of montmorillonite increases the chick's vigor, increases the growth rate of the chicken, reduces the mortality rate of the chicken and increases the body weight and productive egg laying life of the chicken. The inclusion of montmorillonite in the egg laying chicken's feed increases the quantity of eggs produced by the chicken as well as improving the strength and thickness of the egg shell. Also, a greater percentage of the fertilized eggs hatch when montmorillonite is included in the egg laying chicken's diet. While the characteristics of both the chicken and the egg are improved the quantity of feed consumed by the chicken decreases by a significant amount. The manure produced by a chicken which has montmorillonite included in its diet is drier which makes it easier to dispose of.

The following example is given to illustrate and not to limit the invention. All parts and percentages are by weight unless otherwise indicated.

EXAMPLE

An all vegetable basal ration poultry feed for practicing the present invention is prepared by admixing the following ingredients in the indicated parts by weight:

| Ingredient | Parts |
|---|---|
| Alfalfa meal | 100 |
| Brewer's grains | 350 |
| Yellow corn | 400 |
| Corn oil | 20 |
| Grit | 10 |
| Limestone | 250 |
| Can molasses | 50 |
| Phosphate rock | 60 |
| Safflower meal | 380 |
| Salt | 10 |
| Milo | 1110 |
| Soybean meal | 225 |
| Dried whey | 25 |
| Vitamin pre-mix | 10 |

A meat or fish based poultry feed for practicing the present invention is prepared employing essentially the same ingredients in the same proportions above except that fats of animal or fish origin are substituted for the vegetable fats. The protein and lipid content of the basal ration poultry feed is preferably derived primarily from vegetable sources. Preferably the fat composition in the basal ration is comprised largely of vegetable oils having an iodine value of from about 80 to 200. Fats, which have iodine values below about 80, are too saturated for the preferred practice of this invention. Eggs produced by chickens fed with a vegetarian basal ration are generally somewhat lower in cholesterol and saturated fats than are eggs produced by chickens whose feed includes animal or fish rations.

The inclusion of montmorillonite in a primarily vegetable diet in which the protein and lipid constitutents are derived from vegetable rather than animal sources produces particularly beneficial results in several important aspects of the animal's growth and productivity. In particular, the quality of the egg produced utilizing this combination is very good. Those people who are sensitive to the taste and smell of eggs are able to detect a distinct difference between the eggs produced by chickens whose diets include the combination of montmorillonite and an all vegetable basal ration and the eggs produced by chickens whose diets do not include this combination. The eggs produced by the montmorillonite-vegetable ration fed chickens taste better and smell better than eggs produced by other diets.

The use of a primarily vegetable diet in combination with montmorillonite has several benefits with regards to the chicken itself. This diet reduces mortality, increases chick growth rate, productive life, percentage of fertilized eggs hatching live chicks, and productivity.

The benefits obtained through the use of montmorillonite, according to this invention, are enhanced by the combination of the montmorillonite with an all vegetable basal ration. The results obtained using montmorillonite in an all vegetable basal ration appear to be even somewhat better than those obtained by using the montmorillonite in combination with an animal or fish based feed.

To the animal based ration of this example is added 5 percent by weight of montmorillonite from Mina, Nev., having the following composition:

| | Percent |
|---|---|
| Calcium | 2.10 |
| Sulphates | 11.20 |
| Magnesium | 0.60 |
| Silicon | 23.0 |
| Aluminum | 8.8 |
| Iron | 3.2 |
| Potassium | 8.4 |
| Sodium | 2.4 |
| Barium | Trace |
| Boron | 0.0036 |
| Titanium | 0.78 |
| Manganese | 0.035 |
| Lead | Trace |
| Gallium | 0.0094 |
| Copper | 0.0072 |
| Zirconium | 0.038 |
| Vanadium | 0.019 |
| Nickel | 0.0026 |
| Strontium | 0.035 |
| Chromium | 0.028 |
| Cobalt | <0.02 |
| Molybdenum | <0.02 |
| Germanium | <0.005 |
| Lanthanum | <0.05 |
| Tungsten | <0.02 |
| Samarium | <0.004 |
| Gold | Trace |
| Holmium | <0.002 |
| Zinc | Trace |

The montmorillonite is added to the basal ration in the form of a dry powder which is thoroughly admixed with the feed. If desired, the montmorillonite may be pelletized with the feed.

When laying chickens are fed the animal basic ration of this example about 85 out of every 100 fertile eggs will hatch out vigorous chicks. The addition of montmorillonite increases this hatchability rate so that out of every 100 eggs between 90 and 92 will hatch out vigorous chicks. The mortality rate of the egg laying chicken is normally from 18 to 24 percent of the flock per year of egg laying life. With the inclusion of montmorillonite, according to this example, in a nutritionally balanced diet the mortality rate is reduced to from 9 to 12 percent of the flock per year of egg laying life. The commercially productive egg laying life of a hen is considered in these calculations to be four-fifths of the half life. The half life is the period of time it takes for egg production to drop from full production to one-half of what it was at full production. The addition of montmorillonite to a complete ration extends the commercially productive life of the hen by about 15 to 20 percent. A chicken which is fed on a diet which includes montmorillonite, according to this example, will give about 5 percent more eggs throughout its commercial laying life than will a chicken which is fed the same diet without the montmorillonite. This increase in the number of eggs applies at virtually every point throughout the commercially productive life of the hen. In general, the eggs produced by the chicken whose diet includes montmorillonite are also somewhat larger. The addition of montmorillonite also causes the hen to consume from 5 to 10 percent less feed.

The eggs produced by chickens which have montmorillonitrile included in their diet according to this example have stronger and thicker shells. Twelve eggs produced by chickens which have montmorillonitrile included in their diet are crushed by applying force along the major axis of the egg. The average force required to crush these eggs is 9.7 kilograms per square centimeter. One dozen eggs produced by chickens whose diets do not include montmorillonite are also crushed under identical circumstances and procedures. The average crushing force required for these eggs is 5.4 kilograms per square centimeter. The average thickness of the eggs is determined by taking the average of three parts of each egg and the average of 12 eggs. The average thickness of the eggs produced by chickens fed with montmorillonite is 0.38 millimeter, and the average thickness of the egg shell produced by chickens which had no montmorillonite in their feed is 0.35 millimeter.

The inclusion of montmorillonite in a chicken's vegetable based diet from day old throughout life results in about an 8½ percent increase in body weight, and meat which is firmer and of better flavor and odor. The normal condenmnation rate for chickens inspected by the U.S. Department of Agriculture in one area is about 14 percent. The condemnation rate for chickens whose diets have always included montmorillonite according to this example is about 1 percent.

The advantages obtained through the use of montmorillonite according to this example are applicable to a wide variety of animals and in particular to fowl, such as chickens, turkeys, ducks, and geese. The characteristic of increasing the shell strength of the egg is of interest in perpetuating those wild birds whose existence is threatened by the production of eggs with shells so thin that the birds never hatch.

The optimum amount of montmorillonite for inclusion in the diet of beef cattle is believed to be about 10 percent.

The improved results obtained from the use of montmorillonite appear to be generally applicable to all of the recognized nutritionally adequate animal diets. In particular the adavntageous results obtained through the use of montmorillonite are generally applicable to all vegetable, meat and fish based poultry feeds. The reasons for the beneficial results obtained through the use of montmorillonite are not understood.

With reference to generally occurring montmorillonite clays, the montmorillonite employed according to this invention is in general a low expansion mineral which is low in sodium and high in calcium, and is also low in silica and in aluminum oxide. In general, the weight percentages of the principal elements in a montmorillonite which is suitable for use in this invention may vary about as follows:

| | Percent |
|---|---|
| Calcium | 1–3 |
| Magnesium | 0.1–1.5 |
| Silicon | 18–25 |
| Aluminum | 7–10 |
| Sodium | 1–3 |

Preferably, the montmorillonite according to this invention has about the following composition:

| | Percent |
|---|---|
| Calcium | 1.8–2.5 |
| Magnesium | 0.4–0.8 |
| Silicon | 20–24 |
| Aluminum | 8.0–9.5 |
| Sodium | 2.0–2.6 |

Many other elements may be present in amounts of from a trace to less than about 1 percent including, for example, barium, boron, titanium, manganese, lead, gallium, copper, zirconium, vanadium, nickel, strontium, chromium, germanium, lanthanum, tungsten, samarium, gold, ruthenium, holmium, and zinc. Most of these additional elements are generally present in amounts of less than about 0.1 percent. Many of these elements are nutritionally recognized significantly important trace elements.

A typical complete ration for chickens includes about 4 percent fat, 17 percent protein, 55 percent carbohydrate from a source such as wheat, 13 percent ash, 4 percent fiber content and the minimum established levels of essential vitamins and minerals. In addition to the montmorillonite, poultry feeds may conveniently include supplemental nutrients and medicaments. Minerals, such as limestone, rock phosphate, trace metal salts of zinc, magnesium, iron, manganese, copper and potassium may be added in the form of salts of the acids of sulphur and phosphorus acids. Antibiotics such as aureomycine and penicillin may be added. Trace nutrients such as the vitamins A and D may be added. Amino acids may also be added, as well as specific medicaments such as coccidistats.

The protein containing components of the feed may consist of whole grain, such as corn, wheat, barley, oats, rye and millet, and the processed grains, such as cottonseed meal, cornmeal, soybean meal, linseed meal, peanut meal, and the like. Protein sources of animal origin include casein, gelatin, fish meal and slaughterhouse waste.

The fat sources are preferably those of vegetable origin which contain a substantial percentage of unsaturated acid and include; for example, soybean oil, sunflower oil, olive oil, safflower oil, corn oil, peanut oil, cottonseed oil, rice oil, millet oil, wheat germ oil, palm oil, walnut oil, hemp oil, and any other fat with an iodine value of 80 or more. Preferably the fat composition is at least 10 percent linolenic acid.

As will be understood by those skilled in the art, what has been described herein are the preferred embodiments in which modifications and changes may be made without departing from the spirit and scope of the accompanying claims.

We claim:
1. An animal feed composition comprising:
a nutritionally-balanced diet containing montmorillonite clay in an amount ranging from about 1 to 20 weight percent of the total diet, which said montmorillonite contains from about 1 to 3 weight percent calcium, from about 18 to 25 weight percent silicon, from about 7 to 10 weight percent aluminum, and from about 1 to 3 weight percent sodium.

2. An animal feed composition of claim 1 wherein the fat composition of said animal feed has an iodine value of at least about 80.

3. An animal feed composition of claim 1 wherein the montmorillonite is present in an amount ranging from about 2 to 7 weight percent of the total diet.

4. An animal feed composition of claim 1 wherein the montmorillonite contains from about 0.1 to 1.5 weight percent magnesium.

5. An animal feed composition of claim 1 wherein the montmorillonite contains from about 20 to 24 weight percent silicon, and from about 8.0 to 9.5 weight percent aluminum.

6. An animal feed composition of claim 1 wherein the montmorillonite contains from about 1.8 to 2.5 weight percent calcium and from about 2.0 to 2.6 weight percent sodium.

7. A method of raising poultry which comprises feeding said animals in a nutritionally adequate diet including from about 1 to 20 weight percent based on the weight of the total diet of montmorillonite clay, which said montmorillonite clay contains from about 1 to 3 weight percent calcium, from about 18 to 25 weight percent silicon, from about 7 to 10 weight percent aluminum, and from about 1 to 3 weight percent sodium.

8. A method of claim 7 including feeding poultry a nutritionally adequate diet including from about 2 to 7 weight percent of the montmorillonite.

9. A method of increasing the growth, vigor, and productivity of poultry which comprises admixing from about 1 to 20 weight percent based on the weight of the total diet of a montmorillonite clay, which said montmorillonite clay is a low expansion clay containing from about 1 to 3 weight percent calcium, from about 18 to 25 weight percent silicon, from about 7 to 10 weight percent aluminum, and from about 1 to 3 weight percent sodium.

10. A method of claim 9 including mixing from about 2 to 7 weight percent of the montmorillonite in a nutritionally-balanced vegetarian poultry diet.

11. An animal feed composition comprising:
a nutritionally-balanced diet containing an effective amount of montmorillonite clay ranging from about 1 to 20 weight percent of the total diet, which clay is a low expansion clay that contains from about 2 to 2.6 weight percent sodium, from about 20 to 24 weight percent silicon, from about 8 to 9.5 weight percent aluminum, and from about 1.8 to 2.5 weight percent calcium.

12. A method of raising poultry which comprises feeding said poultry a nutritionally adequate diet including an effective amount of a low expansion montmorillonite clay ranging from about 1 to 20 weight percent of the total diet, which clay contains from about 20 to 24 weight percent silicon, from about 1.8 to 2.5 weight percent calcium, from about 2 to 2.6 weight percent sodium, and from about 8 to 9.5 weight percent aluminum.

13. A method of increasing the growth, vigor, and productivity of poultry which comprises admixing an effective amount of a montmorillonite clay ranging from about 1 to 20 weight percent of the total diet with a nutritionally-balanced diet, said clay being a low expansion clay that contains from about 20 to 24 weight percent silicon, from about 2 to 2.6 weight percent sodium, from about 1.8 to 2.5 weight percent calcium, and from about 8 to 9.5 weight percent aluminum.

References Cited

UNITED STATES PATENTS

| | | | |
|---|---|---|---|
| 2,970,912 | 2/1961 | Gehrt | 99—2 |
| 2,739,063 | 3/1956 | Wehrneister | 99—4 |
| 2,162,609 | 6/1939 | Dawe | 99—4 |
| 1,867,063 | 7/1932 | Dawe | 99—4 |
| 2,991,170 | 7/1961 | Szepesi | 71—62 |

NORMAN YUDKOFF, Primary Examiner

H. H. BERNSTEIN, Assistant Examiner

U.S. Cl. X.R.

99—2 R